| United States Patent [19] | [11] | 4,327,237 |
|---|---|---|
| Imparato et al. | [45] | Apr. 27, 1982 |

[54] PROCESS FOR PREPARING VISCOSITY INDEX IMPROVERS FOR LUBRICATING OILS BY CRACKING SYNTHETIC RUBBERS IN THE LIQUID PHASE

[75] Inventors: Luigi Imparato; Giampaolo Gerbaz, both of Milan; Enrico Betta, Pero, all of Italy

[73] Assignee: Agip Petroli, S.p.A., Rome, Italy

[21] Appl. No.: 156,428

[22] Filed: Jun. 4, 1980

[30] Foreign Application Priority Data

Sep. 10, 1979 [IT] Italy .............................. 25567 A/79

[51] Int. Cl.$^3$ .............................................. C07C 4/04
[52] U.S. Cl. .................................... 585/648; 585/241; 585/10; 585/13; 208/106
[58] Field of Search .................. 585/241, 10, 13, 648; 208/106

[56] References Cited

U.S. PATENT DOCUMENTS

| 3,441,628 | 4/1969 | Rätzsch et al. ...................... 585/241 |
| 3,524,732 | 8/1970 | Sweeney ............................. 585/241 |
| 3,956,414 | 5/1976 | Oshima ............................... 585/648 |

*Primary Examiner*—Jacqueline V. Howard
*Attorney, Agent, or Firm*—Morgan, Finnegan, Pine, Foley & Lee

[57] ABSTRACT

A process for preparing viscosity index improvers for lubricating oils consisting of thermally cracking a solution of an olefin copolymer in mineral oil at a temperature of between 250° C. and 350° C. in an inert atmosphere said solution containing free radical scavengers.

4 Claims, No Drawings

PROCESS FOR PREPARING VISCOSITY INDEX IMPROVERS FOR LUBRICATING OILS BY CRACKING SYNTHETIC RUBBERS IN THE LIQUID PHASE

This invention relates to a process for preparing viscosity index improvers (V.I.I.) by cracking synthetic rubbers in the liquid phase.

More particularly, this invention relates to the preparation of viscosity index improvers starting from solutions of olefine copolymers in mineral oil.

More particularly, it relates to the application of liquid phase cracking (vis breaking) to said solutions of olefine copolymers in oil to give V.I.I. having excellent mechanical shear resistance. The lubricating oil used in internal combustion engines must be able to ensure correct operation over a sufficiently long time interval.

In particular, it must be sufficiently fluid at low temperature to enable the motor to start on ignition, and sufficiently viscous at high temperature, i.e. during running, to provide an oil film of suitable thickness for keeping the required surfaces lubricated. These requirements, which are particularly stringent in cold climates or during winter, are satisfied by so-called multigrade oils. These are prepared by adding a polymer to the mineral oil in order to reduce the lowering of the oil viscosity by low temperature. The chemical-physical mechanism by which this is attained is interpreted as a progressive increase in the average dimensions of the clews along which the polymer chains become arranged when dissolved in mineral oil, as the temperature increases. These dimensions are small at low temperature, and thus influence the viscous shear of the oil to a limited extent. They increase as the temperature increases, to hinder the viscous shear to an increasing extent, or rather to oppose the increase in fluidity of the oil to an increasing extent.

In multigrade oil technology, numerous structurally different polymers have been proposed and are currently used. Among these, the amorphous monoolefine copolymers, in particular of ethylene and propylene, have proved particularly effective, and are prepared by well known copolymerisation methods using coordination catalysis. The main advantage of these polymers is the fact that their efficiency in preparing multigrade oils is greater than the efficiency of other structurally different polymers, in the sense that they enable the same result to be obtained at considerably lower concentrations.

For application in the lubricant field, these polymers are normally prepared when required, with both the ratio of the monoolefines used and the molecular weight being monitored during polymerisation.

The molecular weight is a very important variable, because if it is too high, the polymer undergoes mechanical shear during its use in an engine, and this results in a reduction or even a complete loss of efficiency.

On the other hand, polymers of analogous composition used in the synthetic elastomer industry are available commercially in large quantities at a reasonable cost. These obviously cannot be used directly as V.I.I. for lubricants, because their average molecular weight is too high.

Both thermooxidation and mechanical (mastication, extrusion) methods have been proposed for making these polymers suitable in terms of their molecular weight for use in the lubricant field. All these methods start with the solid polymer, which is then dissolved in oil to obtain the fluid additive. However, known methods based on the treatment of the solid polymer do not give satisfactory results, in that it is complicated to prepare polymers of different molecular weight, and in addition the energy cost of the operation is rather high. It has been found that it is possible to treat elastomer polymers already dissolved in mineral oil in order to convert them into viscosity index improving polymers, thus obviating the said drawbacks of the known art, without suffering any degradation during the treatment of the solvent mineral oil.

The process according to the present invention consists of thermally cracking a solution of a monoolefine copolymer in mineral oil at a temperature between 250° C. and 350° C. in an inert atmosphere under energetic stirring for a time varying between 15 and 45 minutes, so as to reduce its molecular weight without prejudicing its effectiveness as a viscosity index improver, and considerably improving its shear stability.

The copolymers used are amorphous copolymers deriving from ethylene and other olefines. These olefines comprise olefines of general formula $R-CH=CH_2$, where R is an aliphatic or alicyclic radical containing 1 to 20 carbon atoms, for example propylene, 1-butene, isobutylene, 1-hexene or 1-decene. Suitable polymers for the purpose are in particular ethylene-propylene copolymers having a propylene content of between 30 and 70% by weight, and preferably between 40 and 50%. These copolymers have an average numerical molecular weight of between 40,000 and 200,000 or more.

The mineral oil is a normal lubricant base of paraffin type, refined in solvent, having a Universal Saybolt viscosity of 150 SSU at 100° F., and currently known as SN 150.

In the description and examples of the present application, the term V.I.I. can refer either to the viscosity index improving polymer or to the mineral oil solution containing the copolymer. Before the thermal cracking, compounds known as free radical scavengers chosen from quinone, phenol or amine aromatic compounds stable at high temperature are added to the solution of copolymer in oil at a concentration varying between 0.5 and 0.1%, in order to reduce the temperature necessary for obtaining a given molecular weight reduction, or, for equal temperatures, to reduce the treatment duration time, or again, for equal temperature and duration times, to obtain greater molecular weight reductions, but all within the aforesaid ranges. As the said scavengers are frequently used as antioxidants in the lubricant field, they do not prejudice the copolymer performance in any way.

The treatment according to the present invention, relative to already known types of treatment which use the solid polymer, enables V.I.I. additives having different levels of mechanical shear stability suitable for all service requirements, from the most severe to the most mild, to be obtained from a single product by varying the temperature, duration of treatment, and type and concentration of the free radical scavenger. It is for example possible to prepare a single batch of polymer-in-oil solution, raise it to the most suitable vis breaking temperature and withdraw quantities from it after different times, so obtaining a mechanical shear stability which increases for each one. The effectiveness of the treatment is evaluated on the basis of a viscosity measurement (ASTM D-445) at 100° C. of the polymer-inoil solution before and after the heat treatment. The effectiveness of the product as a V.I.I. is determined by using it in the formulation of a lubricant for internal combustion engines containing mineral base oils and combinations of detergent-dispersing-inhibitor additives currently used in lubricant technology. For these formulations, the mechanical shear stability is determined using the Kurt Ohrban apparatus in accordance with the DIN 51382 method.

Some examples are given hereinafter for the purpose of better illustrating the invention, but must in no way be considered limiting thereof.

EXAMPLE 1

100 grams of a 12% solution in SN 150 mineral oil of an olefine copolymer formed from ethylene and propylene containing 43% by weight of propylene were weighed into a four neck flask fitted with gas inlet and outlet tubes, a stirrer and thermometer. Maintaining the solution under a stream of nitrogen and energetic stirring, the flask was immersed into a molten salt bath previously heated to 250° C. After remaining there for two hours, the flask was removed from the bath and cooled rapidly under a compressed air jet. The ASTM D-445 viscosity of a portion of the solution was determined, and was found to be 10,000 cst at 100°C. against 27,000 cst of the same solution before treatment.

EXAMPLE 2

Operating as in example 1, the same solution was subjected to thermal cracking for 45 minutes at 300° C. The ASTM D-445 viscosity at the end of treatment was 800 cst at 100° C.

EXAMPLE 3

Operating as in example 2, the treatment time was shortened to 30 minutes. The ASTM D-445 viscosity was 1200 cst at 100° C.

EXAMPLE 4

Operating as in example 2, the treatment time was shortened to 15 minutes. The ASTM D-445 viscosity was 4200 cst at 100° C.

EXAMPLE 5

Operating as in example 1, the solution was subjected to heat treatment for 15 minutes at 350° C. The ASTM D-445 viscosity was 950 cst at 100° C.

EXAMPLE 6

Operating as in example 1, the effect was evaluated of adding known free radical scavengers stable at high temperture and chosen from products of quinone type or from aromatic amines or phenols. Table 1 summarises the results obtained. It will be seen from this example that it is sufficient to add only 0.1% of a free radical scavenger to obtain a final viscosity of 4 to more than 10 times less than the viscosity obtained without adding the scavenger, for equal temperatures and treatment times (see example 4).

TABLE 1

| Reference | Added additive | Concentration of added additive % w | Treatment temperature °C. | Treatment duration min | Viscosity at 100° C. (ASTM D-445) cst after treatment |
|---|---|---|---|---|---|
| 6 A | chloranil | 0.1 | 300 | 15 | 410 |
| 6 B | chloranil | 0.05 | " | " | 330 |
| 6 C | chloranil | 0.01 | " | " | 500 |
| 6 D | chloranilic acid | 0.1 | " | " | 620 |
| 6 E | chloranilic acid | 0.05 | " | " | 590 |
| 6 F | chloranilic acid | 0.01 | " | " | 780 |
| 6 G | phenothiazine | 0.1 | " | " | 560 |
| 6 H | Irganox 1093 | 0.1 | " | " | 800 |
| 6 L | Irganox 1010 | 0.1 | " | " | 1000 |
| 6 M | Ionox 330 | 0.1 | " | " | 1000 |

EXAMPLE 7

The V.I.I. additives prepared by the methods of examples 2 to 6 were used for formulating multigrade oils to SAE 15 W50 grade by using paraffin mineral bases and a commercially available combination of detergent-dispersing-inhibitor additives suitable for satisfying the American MIL-L-46152 and API SE/CC specifications. The formulations obtained were evaluated in terms of their shear stability by using the Kurt Ohrban method of DIN 51382. Table 2 gives the results obtained in comparison with those for two formulations using commercially available V.I.I. additives, here indicated as OCPSS and OCPNSS, the first of which is known to be very stable, whereas the second is known to be only slightly stable to mechanical shear, both having a chemical structure analogous to the olefine copolymers used by us and prepared by suitably controlled polymerisation reactions. In all cases, the mineral oil used was a mixture of paraffin bases, and the concentration by weight of the combination of additives was 10.5%.

It can be seen that for equal viscosities of the formulations, all the V.I.I. additives prepared by method used by us have a shear stability exceeding the that of the V.I.I. additives already available commercially and of analogous composition. The considerable improvement in shear stability which thermal cracking gives to the tested rubber is also apparent.

TABLE 2

| V.I.I. used | Conc. % wt. in mineral oil + additives | Viscosity (ASTM-D-445) at 100° C. cst | Viscosity (ASTM-D-2602) at −18° C. cp | SAE grade | Viscosity (ASTM-D-445) at 100° C.(cst) after DIN 51382 test | % change in viscosity after DIN 51381 test | V.I.I. viscosity (ASTM-D-445) at 100° C. cst |
|---|---|---|---|---|---|---|---|
| OCPSS | 16.1 | 20.1 | 4150 | 15W-50 | 19.2 | 4.5 | 550 |
| OCPNSS | 15 | 19.7 | 4200 | " | 16.6 | 15.7 | 810 |

TABLE 2-continued

| V.I.I. used | Conc. % wt. in mineral oil + additives | Viscosity (ASTM-D-445) at 100° C. cst | Viscosity (ASTM-D-2602) at −18° C. cp | SAE grade | Viscosity (ASTM-D-445) at 100° C.(cst) after DIN 51382 test | % change in viscosity after DIN 51381 test | V.I.I. viscosity (ASTM-D-445) at 100° C. cst |
|---|---|---|---|---|---|---|---|
| rubber as such | 10.5 | 20.1 | nd* | " | 10.7 | 46.8 | 27,000 |
| Example No. 2 | 15.5 | 20.1 | 4200 | " | 19.6 | 3.0 | 800 |
| No. 3 | 15.5 | 20.3 | 4350 | " | 19.1 | 5.9 | 1,200 |
| No. 5 | 15 | 19.8 | 4400 | " | 19.1 | 3.5 | 950 |
| No. 6 A | 17.1 | 20.4 | 4000 | " | 20.1 | 1.5 | 410 |
| 6 B | 17 | 20.1 | 4000 | " | 19.9 | 1.0 | 330 |
| 6 C | 16.9 | 19.7 | 4200 | " | 19.3 | 2.0 | 500 |
| 6 D | 16.1 | 20.5 | 4350 | " | 20.3 | 1.0 | 620 |
| 6 E | 16 | 19.9 | 4200 | " | 19.3 | 3.0 | 590 |
| 6 F | 15.0 | 19.8 | 4200 | " | 19.0 | 4.0 | 780 |
| 6 G | 16.1 | 19.6 | 4350 | " | 19.1 | 2.6 | 560 |
| 6 H | 15.5 | 20.0 | 4100 | " | 19.6 | 2.0 | 800 |
| 6 L | 14.7 | 20.2 | 4100 | " | 19.4 | 4.0 | 1,000 |
| 6 M | 14.7 | 20.0 | 4100 | " | 19.4 | 3.0 | 1,000 |

*indeterminable because of a pronounced Weissenberg effect.

We claim:
1. A process for the preparation of viscosity index improvers for lubricating oils, which process comprises thermally cracking, at a temperature of between 250° C. and 350° C., in an inert atmosphere, under vigorous stirring, a solution of a mono-olefin copolymer in mineral oil, said solution containing of from 0.01 to 0.5 weight percent, based on the weight of the solution, of free radical scavengers.

2. A process as claimed in claim 1, wherein the copolymer has a numerical average molecular weight of between 40,000 and 200,000.

3. A process as claimed in claim 1, wherein the thermal cracking is carried out for a time of between 15 and 45 minutes.

4. A process as claimed in claim 1, wherein the free radical scavengers are chosen from the group consisting of aromatic quinone, phenol and amine compounds.

* * * * *